(12) United States Patent
Mersch

(10) Patent No.: US 6,823,629 B2
(45) Date of Patent: Nov. 30, 2004

(54) METHOD FOR ELIMINATING SQUEAKING NOISES WHEN OPERATING ELECTRIC MOTOR-DRIVEN MOTOR VEHICLE WINDOW LIFTERS

(75) Inventor: Gerhard Mersch, Uetze (DE)

(73) Assignee: ArvinMeritor GmbH, Dietzenbach (DE)

( * ) Notice: Subject to any disclaimer, the term of this patent is extended or adjusted under 35 U.S.C. 154(b) by 144 days.

(21) Appl. No.: 10/123,864

(22) Filed: Apr. 16, 2002

(65) Prior Publication Data

US 2002/0175647 A1 Nov. 28, 2002

(30) Foreign Application Priority Data

Apr. 17, 2001 (DE) .......................................... 101 18 850

(51) Int. Cl.⁷ ............................ E06B 3/00; E05F 15/08; E05F 15/00; G01R 13/00
(52) U.S. Cl. .............................. 49/506; 49/349; 702/69; 701/49
(58) Field of Search ......................... 49/506, 348, 358, 49/350, 352, 502, 360, 374, 349, 409, 410, 340, 475.1; 296/146.9, 146.1; 702/52, 53, 54, 58, 59, 69, 82; 701/29, 49

(56) References Cited

U.S. PATENT DOCUMENTS

| | | | | | |
|---|---|---|---|---|---|
| 3,748,896 A | * | 7/1973 | Barrows | ....................... | 73/671 |
| 5,689,160 A | * | 11/1997 | Shigematsu et al. | ........... | 49/28 |
| 5,982,124 A | * | 11/1999 | Wang | ........................... | 49/140 |
| 6,101,432 A | * | 8/2000 | Her et al. | ..................... | 701/29 |
| 6,131,454 A | * | 10/2000 | Kopp et al. | .................. | 73/457 |
| 6,360,607 B1 | * | 3/2002 | Charette et al. | .............. | 73/587 |

* cited by examiner

Primary Examiner—Hugh B. Thompson, II
(74) Attorney, Agent, or Firm—Carlson, Gaskey & Olds

(57) ABSTRACT

A method for eliminating squeaking noises occurring when operating a window lifter for motor vehicles which is driven by an electric motor is proposed. The squeaking noises are detected by a system for evaluating acoustic signals. This system generates for the duration of the squeaking noise a command signal which is delivered to a window lifter control device. This varies the speed of the electric motor within fixed limits, until the system for evaluating acoustic signals no longer detects any squeaking noise or it is recognised that speed variations are ineffective. The method is particularly advantageous if a voice control system which can be used as a system for evaluating acoustic signals is provided in the motor vehicle.

17 Claims, 5 Drawing Sheets

METHOD FOR ELIMINATING SQUEAKING NOISES WHEN OPERATING ELECTRIC MOTOR-DRIVEN MOTOR VEHICLE WINDOW LIFTERS

BACKGROUND OF THE INVENTION

The invention relates to a method for eliminating squeaking noises occurring when operating a window lifter for motor vehicles which is driven by an electric motor.

Window lifters of this kind may entail the problem, especially after some time in service, of giving rise to squeaking noises, which are highly disturbing to drivers and possibly passengers, when vehicle windows are opened and/or closed. The causes of the squeaking noises are known. They result from vibrations which are produced by sliding movements of the drivers for the window glass on guide rails. The characteristics of the squeaking noises with regard to frequency band and noise level vary from vehicle to vehicle and have to be determined when developing the vehicle, without there being any success in reliably eliminating the noises through purely constructional measures.

The object of the invention is to provide a method by means of which squeaking noises of this kind can be effectively eliminated.

SUMMARY OF THE INVENTION

According to the present invention, there is provided a method for eliminating squeaking noises occurring when operating a window lifter for motor vehicles, the window lifter being driven by an electric motor, wherein the squeaking noises are detected by a system for evaluating acoustic signals which generates for the duration of the squeaking noise a command signal which is delivered to a window lifter control device which varies the speed of the electric motor within fixed limits, until the system for evaluating acoustic signals no longer detects any squeaking noise or it is recognised that speed variations are ineffective.

This method is based on the finding that the squeaking noises occurring when operating window lifters are dependent on the speed at which the drivers slide on the guide rails.

It is preferable to use, as an option, a voice control system provided in the motor vehicle as a system for evaluating acoustic signals. In this case it is assumed that voice control systems (car telephone, telematics, etc.) are already and will in future be provided with increasing frequency in the vehicle. A voice control system of this kind is equipped with a microphone and evaluates the acoustic signals in the vehicle interior. On the basis of the characteristics (frequency band and noise level) of a window lifter squeaking noise which are determined at the development stage, a voice control system is able to recognise an occurring noise as a window lifter squeaking noise.

If the noise is detected as a window lifter squeaking noise, the command signal which is thereupon generated can advantageously be delivered to the window lifter control device via a CAN (controller area network), if this is provided. In this case the information that a window lifter is squeaking is relayed by means of the added-feature CAN to all nodes of the CAN network.

The speed variation of the electric motor expediently takes place by means of pulse width modulation (PWM) signals. This opens up the advantageous possibility of storing the pulse width modulation state which exists upon cessation of the squeaking noise and the position of the vehicle window at the time, and of retrieving this pulse width modulation state from the memory each time the vehicle window passes through this position in order to control the speed of the electric motor accordingly.

The variation in the speed of the electric motor within the fixed limits preferably takes place stepwise.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
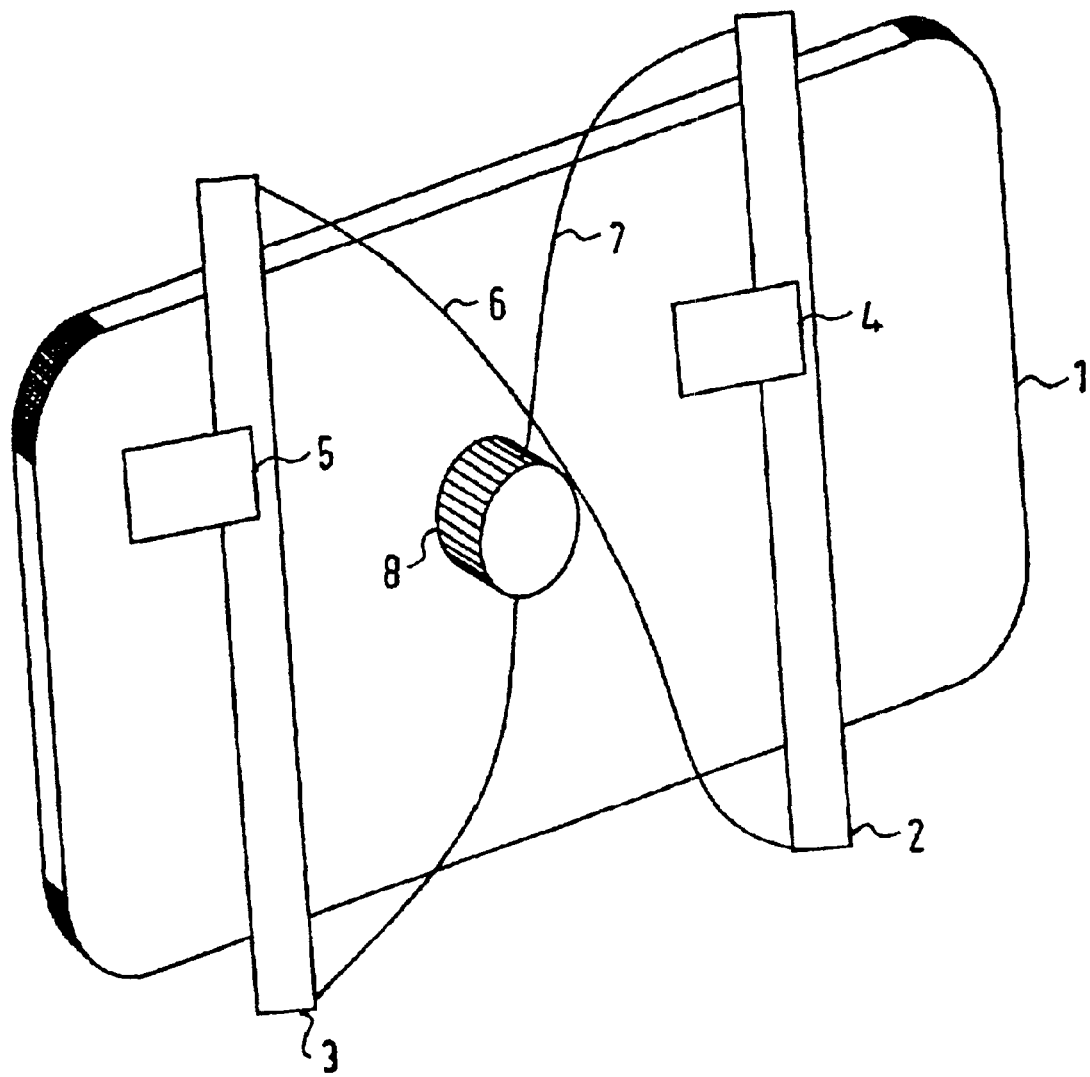
FIG. 1 is a perspective view of a door module with window lifter.

The door module 1 which is represented in FIG. 1 bears the essential elements of the window lifter, i.e. two guide rails 2 and 3, drivers 4 and 5, which are guided in sliding fashion on the guide rails 2 and 3 and which establish the connection with the window glass (not shown), the drive elements 6 and 7 for the drivers 4 and 5, and the electric motor 8, which displaces the drivers 4 and 5 on the guide rails 2 and 3 synchronously and in the same direction via the drive elements 6 and 7.

Figure 2:
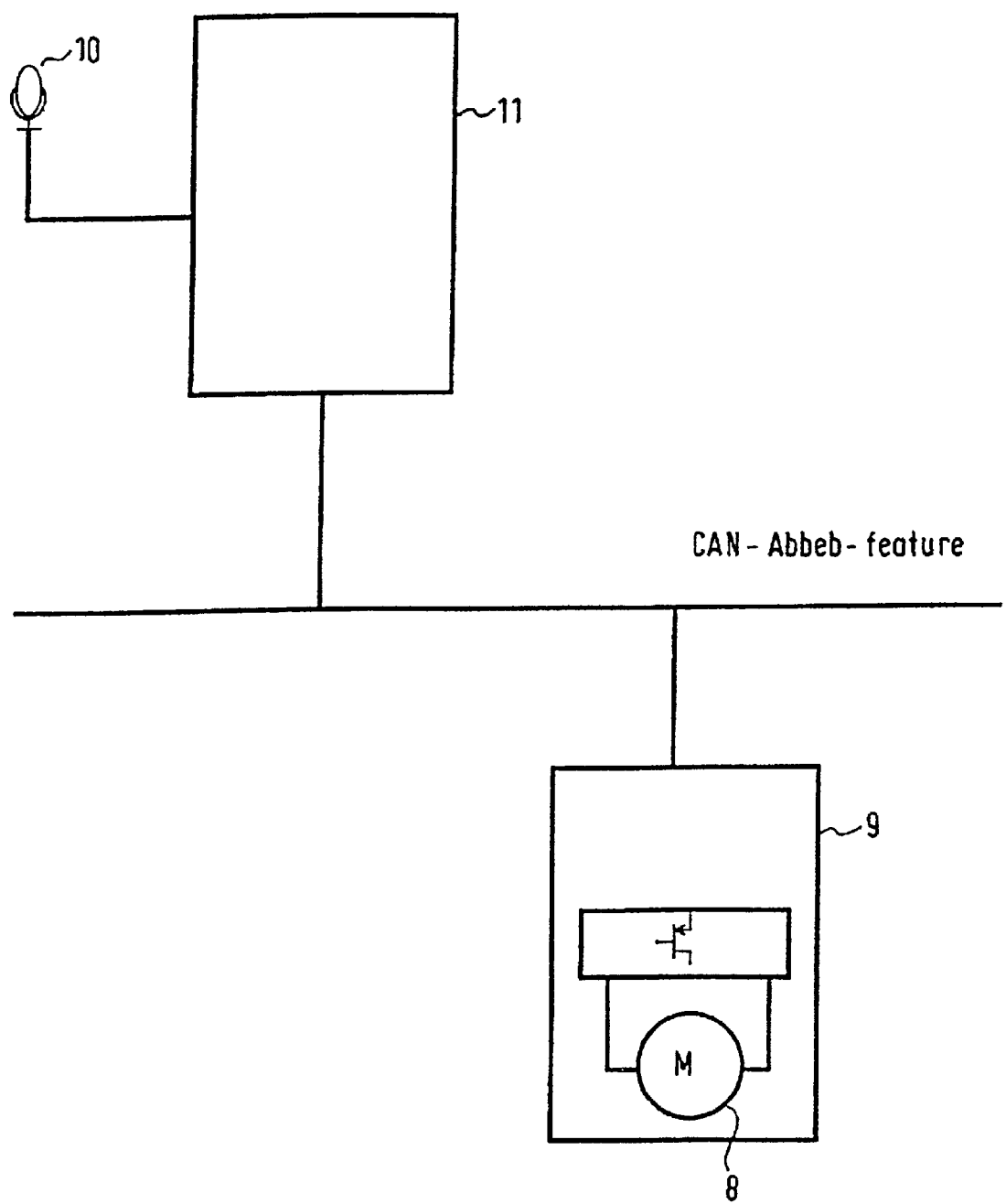
FIG. 2 is a diagram of the system for evaluating acoustic signals and the window lifter control device.

As can be seen from FIG. 2, the noises in the vehicle interior are picked up by the microphone 10 and delivered as acoustic signals to the system 11 for evaluating acoustic signals. The system 11 recognises the squeaking noise and generates a command signal which is delivered to the window lifter control device 9 by means of the added-feature CAN. The window lifter control device 9, which is just moving the vehicle window concerned, thus receives the information on the squeaking noise.

The window lifter control device 9, which now has the information that the window lifter which it is currently driving is causing a squeaking noise, takes measures to eliminate the squeaking noise. These consist in starting to vary the speed of the window lifter at the window concerned stepwise within an upper and a lower maximum deviation from the nominal speed by way of the motor speed upon receiving the command signal.

Figure 3:
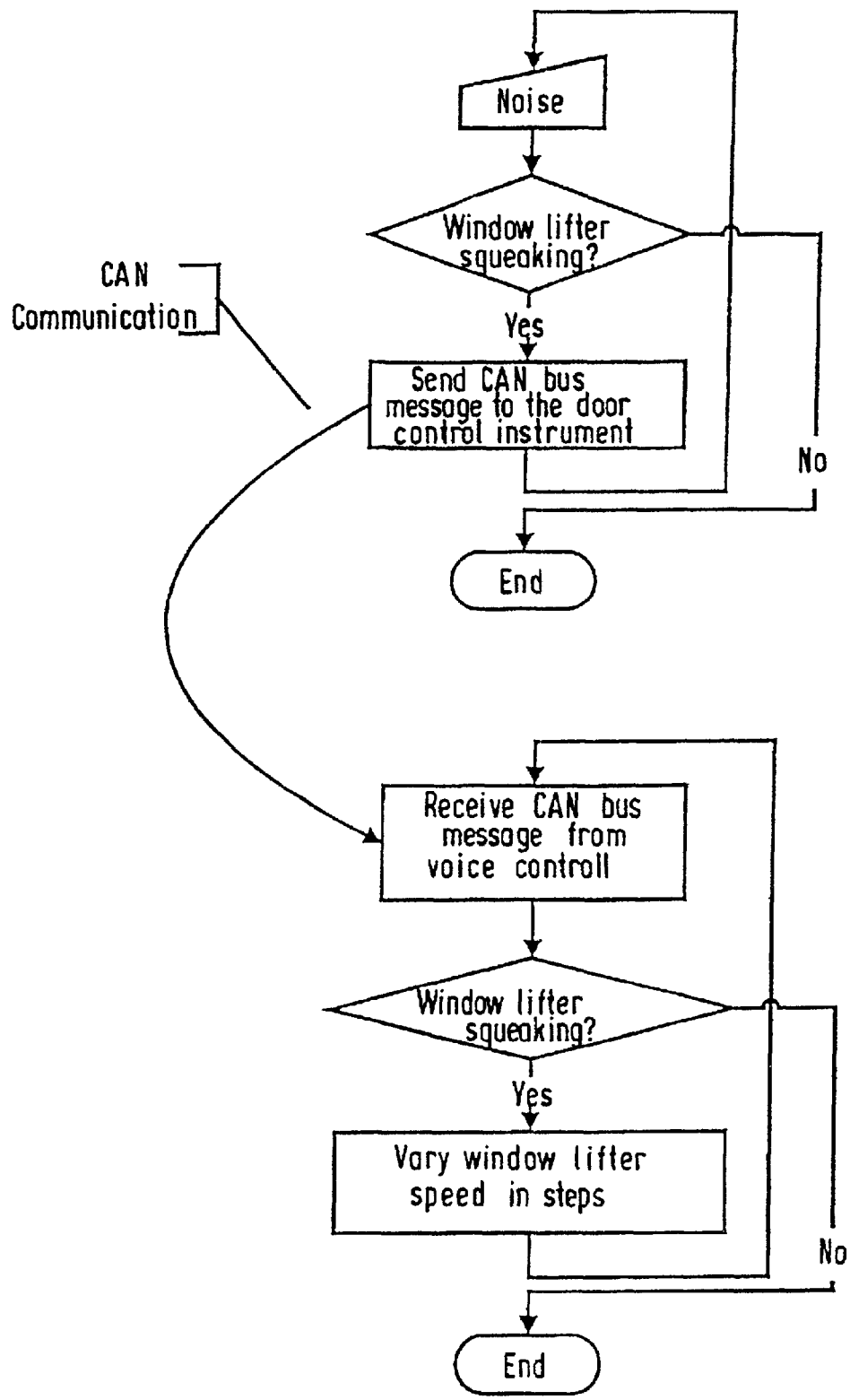
FIG. 3 is a flow diagram of the method.

If—for simplification purposes—a maximum of two steps, i.e. +5% and −5% of the nominal speed, is taken as a starting point, this means that the window lifter control device 9 initially increases the speed by +5%. If the command signal from the system 11 for evaluating acoustic signals is not terminated, the speed is sequentially adjusted to −5%, +10% and −10%. If the command signal is not terminated during these variations, the nominal speed is re-selected. Should, however, a variation of, for example, −5% be effective, i.e. the command signal ceases, this value is stored together with the actual position of the window lifter and always selected during subsequent movements of the window lifter concerned when the window reaches the corresponding position. A simplified representation of the procedure can be found in FIG. 3.

Figure 4:
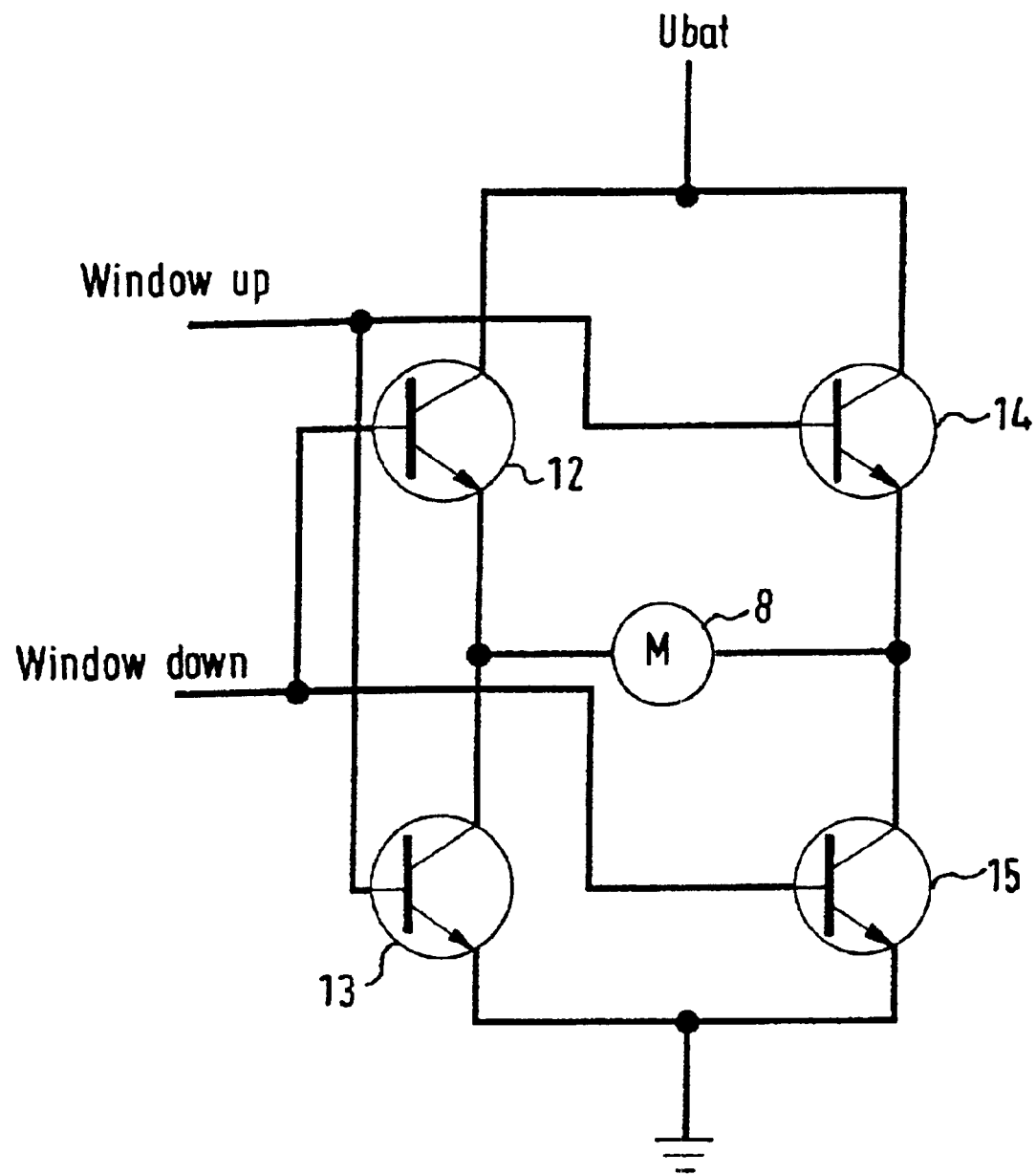
FIG. 4 is an electric circuit for powering the motor.
Figure 5:
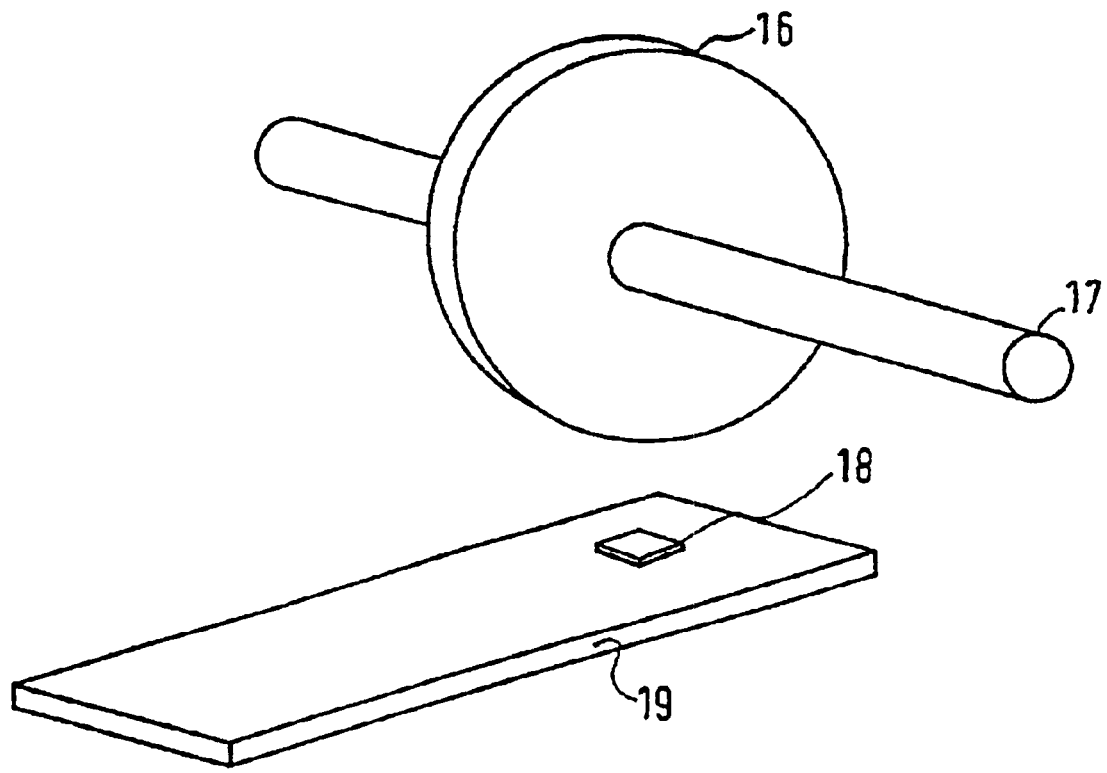
FIG. 5 is a diagrammatic representation of the device for reading out the window lifter position.

In order to control the speed of the window lifter via the window lifter control device 9 and read out the position of the window lifter or window, semiconductor switches 12 to 15 are used to power the electric motor 8, as shown in FIG. 4. Only semiconductor switches enable the speed of the window lifter motor to be adjusted by pulse-width-modulated powering with a variable on-off ratio. The window lifter position is also read out by means of a magnetic ring 16 on the motor shaft 17 and by means of a Hall-effect sensor 18 on the electronics, as represented diagrammatically in FIG. 5. In this case the electronics are represented by a circuit board finger 19.

I claim:

1. A method for eliminating a squeaking noise occurring when operating a window lifter for a motor vehicle, including the steps of:

driving the window lifter with an electric motor;

detecting a squeaking noise with a system for evaluating acoustic signals;

generating for the duration of the detected squeaking noise a command signal;

delivering the command signal to a control device; and varying a speed of the electric motor responsive to the command signal within a selected limit, until the system for evaluating acoustic signals no longer detects any squeaking noise or the selected limit is reached.

2. The method according to claim 1, including evaluating acoustic signals using a voice control system provided in the motor vehicle.

3. The method according to claim 2, including delivering the command signal to the control device using a controller area network system.

4. The method according to claim 1, including varying the speed using pulse width modulation signals.

5. The method according to claim 4, including storing a position of a vehicle window and a pulse width modulation state indicative of the pulse width modulation signals corresponding to cessation of the squeaking noise;

retrieving the pulse width modulation state each time the vehicle window passes through the stored position to control the speed of the electric motor accordingly.

6. The method according to claim 1, including using selected step increments for varying the speed of the electric motor.

7. A window lifter system for motor vehicles comprising:

a window lifter assembly having guide rails and drivers that are selectively moveable along the guide rails;

an electric motor that selectively moves the drivers;

a window lifter control device that controls the operation of said electric motor to selectively vary a speed of said electric motor; and a squeak detector that detects a squeaking noise caused by movement of the drivers and provides a squeak signal indicative of the detected squeaking noise, the window lifter control device varying the speed of the electric motor responsive to the squeak signal.

8. The system according to claim 7, wherein said squeak detector includes a microphone.

9. The system according to claim 7, including a controller that provides a command signal responsive to the squeak signal and the command signal is communicated on a controller area network to said window lifter control device, which varies the electric motor speed responsive to the command signal.

10. The system according to claim 7, wherein said window lifter control device uses pulse width modulation to vary the speed of said electric motor.

11. The system according to claim 7, wherein said window lifter control device varies the speed of said electric motor within selected limits in selected increments.

12. The system according to claim 7, including memory associated with said window lifter control device, the memory containing speed information regarding a motor speed used to eliminate squeaking under an operation condition and said window lifter control device using the information from the memory for subsequent electric motor control at said operation condition.

13. The system of claim 12, including a window position indicator and wherein window position information is associated with the speed information in the memory.

14. The system of claim 7, wherein the window lifter control device varies the speed whenever the squeak signal indicates squeaking exists until a selected time has expired.

15. A window lifter assembly, comprising:

a motor operably associated with at least one window lift driver such that operation of the motor causes selective movement of the window lift driver; and a controller that determines when a squeaking noise occurs which is associated with movement of the window lift driver and responsively varies a speed of operation of the motor until the squeaking noise ends or a selected limit on varying the speed is reached.

16. The assembly of claim 15, wherein the controller stores information regarding a state of the motor operation at a time when the squeaking noise ended and stores information regarding a corresponding window position and the controller uses the stored state of the motor operation information to correspondingly control the operation of the motor during a subsequent window movement near the corresponding window position.

17. The assembly of claim 15, wherein the controller generates a motor varying command signal responsive to determining when the squeaking noise occurs.

* * * * *